United States Patent [19]

Haws

[11] 4,219,279
[45] Aug. 26, 1980

[54] MOBILE GUNNITE MATERIAL MIXER

[76] Inventor: Paul M. Haws, 3144 S. 57th West Ave., Tulsa, Okla. 74107

[21] Appl. No.: 23,698

[22] Filed: Mar. 26, 1979

[51] Int. Cl.³ .............................................. B28C 7/04
[52] U.S. Cl. ........................................ 366/35; 366/37
[58] Field of Search ...................... 366/30, 33, 35, 37, 366/38, 50, 49, 67, 177, 181

[56] References Cited

U.S. PATENT DOCUMENTS

| | | | |
|---|---|---|---|
| 304,615 | 9/1884 | Church | 366/38 |
| 2,896,771 | 7/1959 | Mecham | 366/35 |
| 3,456,925 | 7/1969 | Gallagher | 366/49 |
| 3,917,236 | 11/1975 | Hanson | 366/49 |

*Primary Examiner*—Robert W. Jenkins
*Attorney, Agent, or Firm*—Head & Johnson

[57] ABSTRACT

A mobile gunnite material mixer comprising a vehicle having a first load carrying portion for housing a supply of sand, a second load carrying portion separate from the first load carrying portion for housing a supply of cement, a mixing apparatus spaced outboard of the second load carrying portion, conveying belt disposed beneath the first and second load carrying portions and extending to the mixing apparatus, the belt being in constant linear motion during use of the apparatus whereby a quantity of sand is initially deposited on the moving belt and a quantity of cement is deposited on the moving belt over previously deposited sand, and the sand-cement mixture is discharged into the interior of the mixing apparatus wherein the sand and cement are thoroughly mixed and discharged into the usual gunnite delivery apparatus. The gunnite is mixed with water in the delivery apparatus whereupon the fluid mixture may be sprayed onto a surface in the usual manner.

6 Claims, 3 Drawing Figures

MOBILE GUNNITE MATERIAL MIXER

BACKGROUND OF THE INVENTION

1. Field of the Invention

This invention relates to improvements in mixing apparatus and more particularly, but not by way of limitation, to a gunnite mixing apparatus mounted on a vehicle for mobility.

2. Description of the Prior Art

There are many mixer vehicles available today for transporting and mixing of various combinations of dry materials and in some instances for mixing the dry materials with liquids. For example, the Gerald J. Gallagher U.S. Pat. No. 3,456,925, issued July 22, 1969, and entitled "Mixer Vehicle" relates to a wheeled vehicle having a plurality of storage gins for dry materials are mixed with the water, and the fluid mixture is discharged into a trough in the proximity of beaters or paddles and is then conveyed to an augar for ultimate discharge from the apparatus. Whereas many of these vehicles are in widespread use, and perform the function for which they are intended, most of the devices are complicated in use and expensive in manufacture, the disadvantages of which will be apparent.

SUMMARY OF THE INVENTION

The present invention contemplates a novel mobile gunnite materials mixer apparatus which is particularly designed and constructed for overcoming the forgoing disadvantages. The novel apparatus comprises a wheeled vehicle having a first load carrying portion in which a quantity of sand is carried. The bottom of the first load carrying portion is provided with an opening disposed in substantial alignment with a conveyor belt which moves continually during use of the apparatus, and in a direction passing beneath the first load carrying portion and toward an augar drive apparatus spaced from the first load carrying portion. A second load carrying portion is interposed between the first load carrying portion and the augar drive apparatus, and a quantity of cement is stored or carried in the second load carrying portion. The bottom of the second load carrying portion is provided with an opening disposed in substantial alignment with the conveyor belt. During use of the apparatus, sand is discharged from the first load carrying portion and deposited on the conveyor belt moving therebeneath. The moving belt carries the sand in a direction toward the augar apparatus, and as the belt passes beneath the second load carrying portion, cement is discharged therefrom onto the sand present in the moving belt. Of course, the desired quantities and proper ratios of the sand and cement are deposited on the belt in this overlaying manner, and as the belt approaches the augar apparatus, the sand-cement mixture is discharged into the augar. The dry materials are efficiently mixed by the action of the augar, and carried through the augar apparatus for discharge from the outer end thereof into the usual gunnite delivery apparatus normally used in such operations. Water is added to the mixed sand and cement within the delivery apparatus, and the fluid mixture may be blown from the delivery apparatus in the usual manner for application to a surface during a construction operation, or the like. When the augar apparatus is in use, the inner end thereof is positioned at the outer end of the conveyor belt for receiving the sand mixture therefrom, and the outer end extends substantially axially outwardly from the vehicle whereby the sand-cement mixture may be discharged into the delivery apparatus. However, when the vehicle is in motion for transport to the site of a new of different construction operation, the augar apparatus may be moved to a storage position in the proximity of the rear of the vehicle for precluding interference with the normal driving operation of the vehicle. The novel mobile gunnite materials mixer apparatus is simple and efficient in operation and economical and durable in construction.

DESCRIPTION OF THE PREFERRED EMBODIMENT

Figure 1:
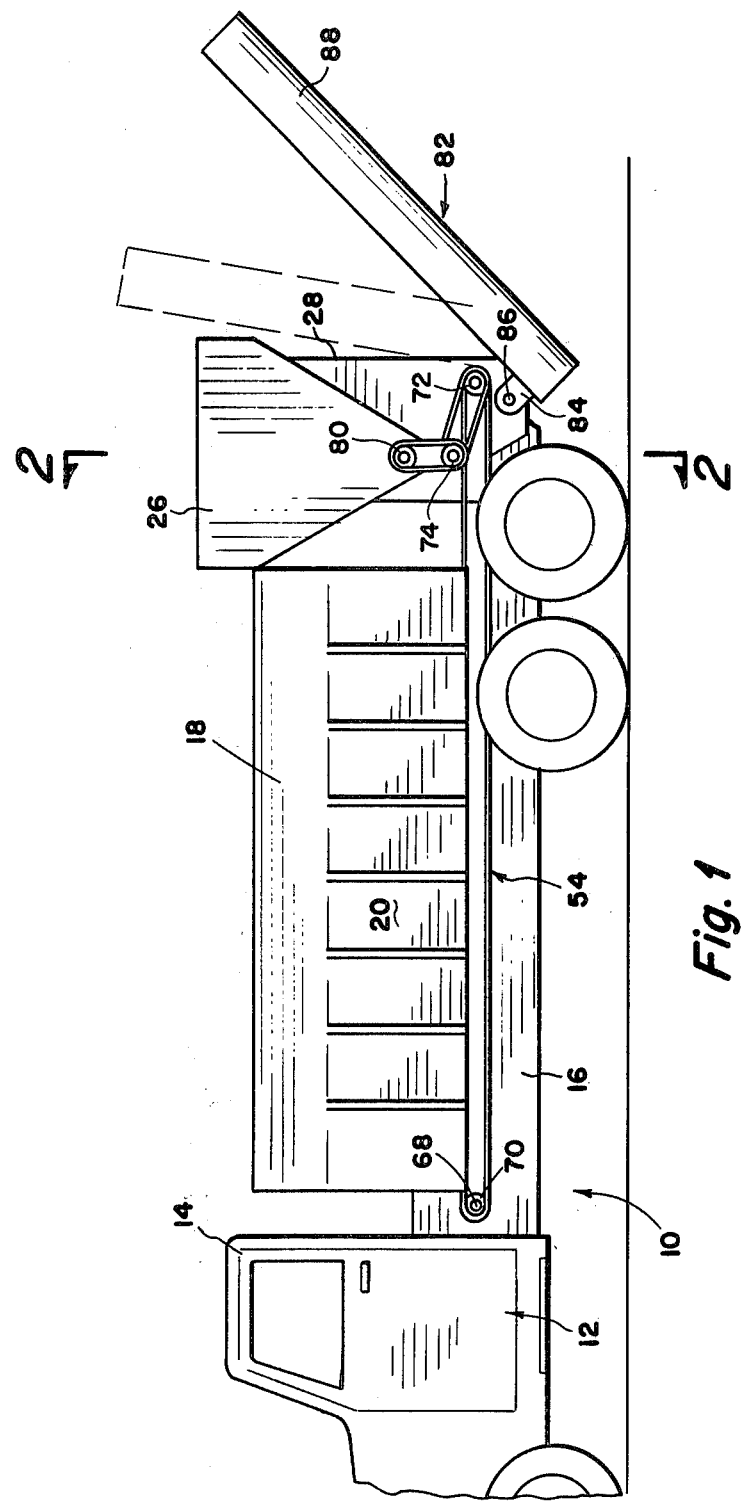
FIG. 1 is a side elevational view of a mobile gunnite materials mixer embodying the invention, with a portion of the forward end of the vehicle broken away for purposes of illustration, and depicting the operating position of the augar apparatus in solid lines and the transporting position thereof in broken lines.

Referring to the drawings in detail, reference character 10 generally indicates a mobile gunnite mixer apparatus comprising a suitable wheeled vehicle 12 having a cab section 14 and a rear bed section 16, as is well known. A first load carrying portion 18 is mounted on the bed section 16 in any well known manner for storage of a first material such as sand. Whereas the portion 18 may be of any suitable construction, it is preferably a substantially elongated open box-like container provided with downwardly and inwardly directed sidewalls 20 and 22 (FIG. 2) for facilitating discharge of the contents thereof downwardly by gravity through a longitudinally extending centrally disposed opening 24 (FIG. 3). It is preferable to provide suitable doors (not shown) across the opening 24 for opening and closing the opening 24 in order to regulate the discharge of materials from the portion 18, as will be hereinafter set forth in detail. A typical vehicle of this type construction which may be adapted to encompass the present invention is that commonly known as Chief model FA Hyd. All-hydraulic Lime and Fertilizer Spreader, manufactured and sold by Henderson Mfg. Company, Manchester, Iowa.

A second load carrying portion or hopper 26 is mounted on the bed 16 rearwardly of the portion 18 and separate therefrom for storage of a second material therein, such as cement. The hopper 26 may be supported from the bed 16 in any suitable or well known manner, such as by a pair of spaced support plates 28 and 30 welded or otherwise secured between the be 16 and the outer periphery of the hopper 26. The hopper 26 is preferably open at the top thereof, and is of a substantially box-like construction comprising a pair of spaced substantially vertical end walls 32 and 34 and a pair of substantially identical but oppositely disposed sidewalls having downwardly and inwardly directed lower portions 36 and 38. The diverging sidewalls 36 and 38 facilitate the accumulation of the contents of the hopper 26 at the lower portion thereof, as is well known. A centrally disposed discharge port 40 is provided in the bottom of the hopper 26 for discharge of the contents of the hopper by gravity, as will be hereinafter set forth. Of course, it is preferable to provide a suitable closure means (not shown) for the port 40 for facilitating control of the discharge of materials therethrough, as is well known.

A baffle member of substantially inverted F-shaped configuration is secured in the hopper 26 in the proximity of the port 40 for facilitating an even distribution of the contents within the hopper during loading thereof. The baffle 42 may be secured between the diverging sidewalls 36 and 38 in any suitable manner, and the side edges thereof are preferably provided with aligned arcuate recesses 44 and 46 in order to assure freedom of movement of the contents of the hopper to the port 40 as will be hereinafter set forth in detail. In addition a shaft 48 is suitably journalled between the end walls 32 and 34 and extends through the recesses 44 and 46 as particularly shown in FIGS. 2 and 3. A first spiral or helical flange 50 is provided around the outer periphery of the right hand section of the shaft 48 as viewed in FIG. 2, and rotates simultaneously therewith for directing the contents of the hopper which surround that portion of the shaft in a direction toward the discharge port 40. A second spiral or helical flange 52 is provided around the outer periphery of the left hand section of the shaft 48 and is oppositely disposed with respect to the helical flange 50 for directing the contents of the hopper which surround the left hand portion of the shaft in a direction toward the discharge port 40, as will be more fully set forth hereinafter.

An endless belt or conveyor apparatus generally indicated at 54 extends longitudinally along the bed 16 and is preferably substantially centrally disposed between the outer sides thereof for passing directly below the elongated opening 24 of the first load carrying portion 18 and the port 40 of the hopper 26. The conveyor apparatus 54 as shown herein comprises a drive shaft 56 (FIG. 2) of a suitable power supply or motor 58 and which extends through and is suitably journalled in the support flanges 28 and 30. A suitable roller 60 is disposed around the outer periphery of the shaft 56 and disposed between the flanges 28 and 30 for receiving a suitable endless belt 62 therearound. The roller 60 is rotated about its own longitudinal axis by the drive shaft 56, and the frictional engagement of the roller 60 with the belt 62 causes the belt 62 to move constantly during actuation of the motor 58, as is well known. Of course, the opposite end of the conveyor apparatus 54 is provided with a similar rotatable shaft 68 and roller 70 for supporting the apparatus 54. The shaft 56 is preferably rotated in the proper direction for causing the upper portion of the belt 62 to move in a direction toward the rear of the vehicle, as indicated by the arrow 64, and the lower portion of the belt to move in a direction toward the front of the vehicle as indicated by the arrow 66.

Figure 2:
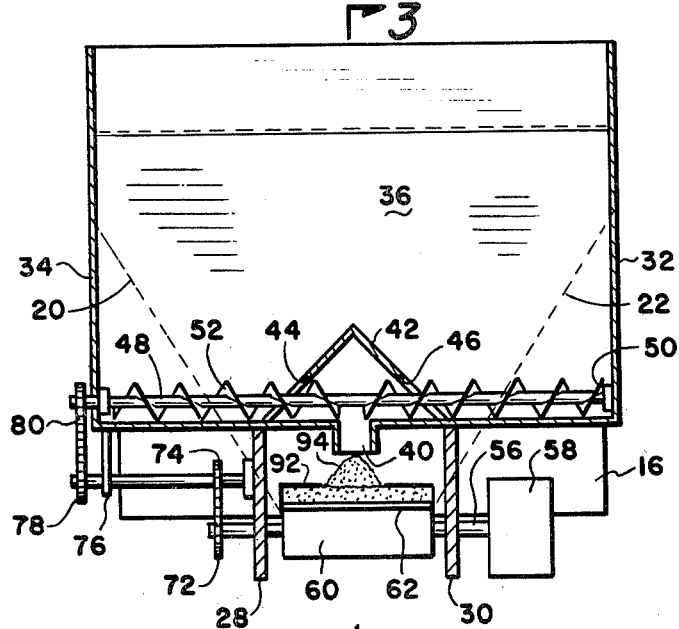
FIG. 2 is a sectional view taken on line 2—2 of FIG. 1, with portions eliminated for purposes of illustration.
Figure 3:
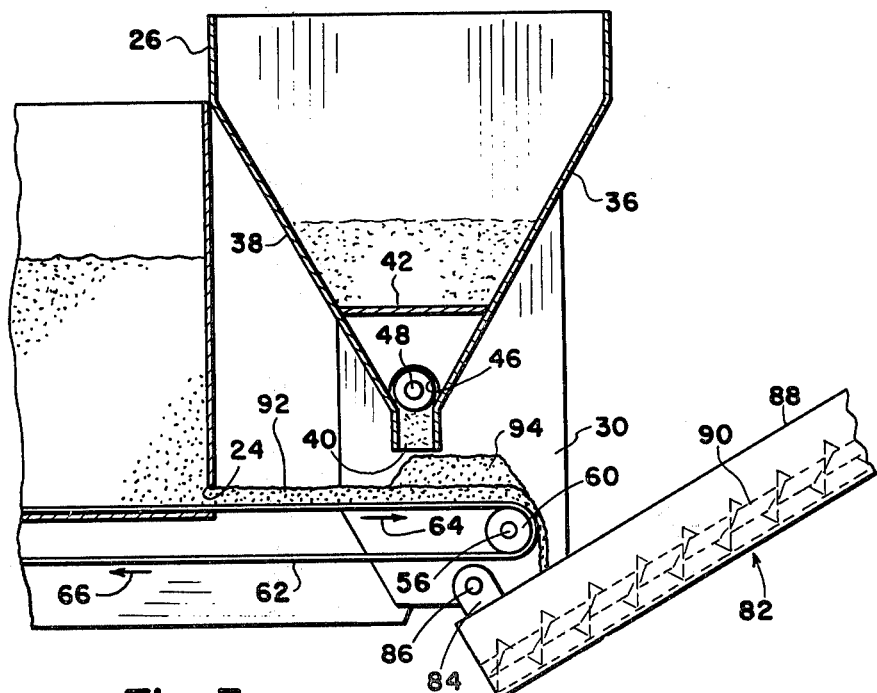
FIG. 3 is a view taken on line 3—3 of FIG. 1, with portions shown in broken lines for purposes of illustration.

The outer end of the drive shaft 56 extends outboard of the support flange 28, as shown in FIG. 2, and carries a first gear member 72 which is in meshing engagement with a second gear 74. The gear 74 is keyed to or otherwise secured to a rotatable shaft 76 which is suitably journalled between the flange 28 and a downwardly extending flange 76 depending from the hopper 26 in spaced relation to the flange 28. The outer end of the shaft 76 is provided with a third gear member 78 which is in meshing engagement with a fourth gear 80. The gear 80 is operably connected with the outer end of the shaft 48, which extends from the interior of the hopper 26, as shown in FIG. 2. It will be apparent that rotation of the drive shaft 56 is transmitted to the shaft 48 through the gear train for coordinating the actuation of the shaft 48 with the actuation of the conveyor apparatus 54.

An augar apparatus 82 is disposed at the rear of the vehicle, preferably outboard of the hopper 26, and may be pivotally secured to the bed 16 in any suitable manner, such as by a pair of spaced flanges 84 (only one of which is shown in FIG. 1) which are pivotally secured to the respective support flanges 28 and 30 as indicated at 86. The augar apparatus comprises an elongated housing 88 having at least the opposite ends thereof open whereby materials may be loaded into the housing at one end and discharged therefrom at the opposite end. A suitable augar 90 is journalled in the lower portion of the housing 88 as viewed in FIG. 3, and extends longitudinally therethrough for moving the contents of the housing from the receiving end to the discharge end, as will be hereinafter set forth. When the housing 80 is in the operating position as shown in solid lines in FIG. 1, the inner end thereof is open to communication with the outer end of the conveyor apparatus 54 for receiving materials therefrom, and the outer end of the housing 88 is open to the usual gunnite delivery apparatus (not shown).

In operation, the vehicle 12 may be driven to the site of use in the usual or well known manner, and positioned in such a manner that the outer end of the augar apparatus 82, when in the operating position thereof, will be disposed immediately above the usual gunnite delivery apparatus (not shown). The augar apparatus is preferably pivoted about the pivots 86 in a direction for placing the housing 88 in a position substantially adjacent the rear of the hopper 26 as shown in broken lines in FIG. 1 during driving of the vehicle from site to site. However, when the vehicle is in position for operation of the mixer apparatus 10, the housing 88 is preferably pivoted in a direction for placing the housing in the position shown in solid lines in FIG. 1.

The first load portion 18 of the vehicle 12 is provided with a supply of sand, and the hopper 26 is provided with a load of cement, these being the materials for use in the making of a gunnite mixture. When the augar housing has been placed in the operational position, the motor 58 may be activated in any well known manner. Of course, the motor may be operably connected with the electrical system of the vehicle, if desired, or may be provided with independent power means (not shown), as desired. Upon activation of the motor 58, the belt 64 begins to move in the direction indicated by the arrows 64 and 66, and the shaft 48 within the hopper 26 is rotated. The doors or closure means controlling the opening 24 may be activated in the usual manner for opening the interior of the portion 18 to the upper portion of the belt 62. The quantity of sand deposited on the surface of the belt may be predetermined by the size of the opening in combination with the distance between the upper surface of the belt 62 and the bottom of the opening 24, as is well known. In this manner, the optimum quantity of sand for the ultimate gunnite mixture may be deposited on the belt 62.

The moving belt 62 carries the sand in a direction toward the augar housing 88, as will be seen in FIG. 3, and as indicated at 92. As the sand passes beneath the discharge port 40, the closure means for the port 40 may be activated for opening the interior of the hopper 26 to the belt passing therebelow. The rotation of the shaft 48 moves the cement within the hopper 26 toward the port 40 whereupon the cement falls by gravity onto the surface of the sand carried by the belt 62, and as indicated at 94 in FIG. 3. The quantity of the cement being deposited on the sand is predetermined in order to provide the optimum ratio of sand and cement for the ultimate gunnite mixture. Of course, the initial operation of the apparatus requires that the opening 24 be initially opened for depositing a layer of sand on the belt prior to passage of the belt beneath the cement hopper. However, once the sand has reached the position directly beneath the port 40 and the cement has begun to be deposited on the layer of sand, both the port 40 and the opening 24 may remain open during the entire gunnite mixing operation.

The mixture of sand and cement, in the proper ratios as preselected, falls from the outer end of the conveyor apparatus 54 by gravity and is discharged into the housing 88, as shown in FIG. 3. The augr 90 is rotated in any well known manner for intimately mixing the sand and cement and moving the mixture in a direction toward the outer end of the housing 88. Of course, the continued operation of the augar 90 causes the discharge of the sand-cement mixture from the outer end of the housing for depositing thereon in the usual gunnite delivery apparatus.

A proper and preselected quantity of water is mixed with the sand-cement mixture within the gunnite delivery apparatus, and the fluid mixture may be sprayed or otherwise applied to the surface wherein the gunnite material is needed. This is a well known method for the application of gunnite during a construction operation, or the like.

From the foregoing it will be apparent that the present invention provides a novel mobile gunnite materials mixer apparatus wherein a supply of sand and a separate supply of cement are carried by a wheeled vehicle. An endless belt conveyor apparatus is mounted on the vehicle and passes beneath the sand supply and cement supply for receiving preselected quantities of the materials thereon. The sand and cement materials are delivered to an augar apparatus whereupon the materials are intimately mixed and discharged into the usual gunnite delivery apparatus. The gunnite may then be prepared and applied in the usual or well known manner.

Whereas the present invention has been described in particular relation to the drawings attached hereto, it should be understood that other and further modifications, apart from those shown or suggested herein may be made within the spirit and scope of this invention.

What is claimed is:

1. A mobile gunnite material mixer comprising a wheeled vehicle having a cab section and a bed section, a first load carrying portion mounted on the bed section for receiving a quantity of sand therin, a second load carrying portion mounted on the bed section for independently receiving a quantity of cement therein, conveyor means operably mounted on the bed section and extending beneath the first and second load carrying sections, a mixer apparatus carried by the bed section and disposed outboard of the second load carrying portion and having one end in open communication with the conveyor apparatus and the opposite end open for discharging materials therefrom, said first and second load carrying portions being provided with discharge port means at the lower portions thereof for selectively depositing the sand and cement on the conveyor apparatus whereby the conveyor apparatus conveys the sand and cement to the mixer apparatus for discharge therein, and wherein the second load carrying section comprises a hopper, a baffle member disposed within the hopper for facilitating even distribution of the cement material therein, and augar means operably secured within the hopper for facilitating movement of the cement to and from the discharge port means, and wherein drive shaft means is operably connectd with the conveyor apparatus, and gear train means is interposed between the drive shaft means and the augar means within the hopper for simultaneous actuation of the augar means and conveyor apparatus.

2. A mobile gunnite material mixer as set forth in claim 1 wherein the first load carrying portion is in open communication with the conveyor apparatus upstream of the second load carrying portion for discharge of the sand onto the conveyor apparatus prior to discharge of the cement thereon and is provided with means for limiting the depth of the sand on the conveyor apparatus whereby the ratio of sand and cement may be selected in accordance with the optimum ratio.

3. A mobile gunnite material mixer as set forth in claim 1 wherein the conveyor apparatus comprises an endless belt extending between and around a pair of spaced roller members for constant movement of the belt during operation of the gunnite material mixer, and wherein the upper section of the belt moves in a direction from the first load carrying portion toward the mixer apparatus.

4. A mobile gunnite mixer as set forth in claim 1 wherein the mixer apparatus comprises a housing having one end open for receiving the sand and cement from the conveyor apparatus and the opposite end open for discharge of material therefrom, and an aguar means extending longitudinally through the housing for intimately mixing the sand and cement and moving the mixture longitudinally through the housing toward the discharge end thereof, said augar means comprising a screw member extending throughout the length of the housing.

5. A mobile gunnite material mixer as set forth in claim 1 wherein the mixer apparatus is pivotally secured to the bed section for movement between an operational position and a storage position.

6. A mobile gunnite material mixer comprising a wheeled vehicle having a cab section and a bed section, a first load carrying portion mounted on the bed section for receiving a quantity of sand therein, a second load carrying portion mounted on the bed section for independently receiving a quantity of cement therein, conveyor apparatus operably mounted on the bed section and extending beneath the first and second load carrying sections, a mixer apparatus carried by the bed section and disposed outboard of the second load carrying portion and having one end in open communication with the conveyor apparatus and the opposite end open for discharing materials therefrom, said first and second load carrying portions being provided with discharge port means at the lower portions thereof for selectively depositing the said and cement on the conveyor apparatus whereby the conveyor apparatus conveys the sand and cement to the mixer apparatus for discharge therein, and wherein the second load carrying section comprises a hopper, a baffle member disposed within the hopper for facilitating even distribution of the cement material therein, augar means operably secured within the hopper for facilitating movement of the cement to and from the discharge port means, and wherein the conveyor apparatus comprises an endless belt extending between and around a pair of spaced roller members for constant movement of the belt during operation of the gunnite material mixer, and wherein the upper section of the belt moves in a direction from the first load carrying portion toward the mixer apparatus, and wherein drive shaft means is operably connected with one of said rollers for rotating thereof about its own axis, and gear train means is interposed between the drive shaft means and the augar means within the hopper for simultaneous actuation of the augar means and endless belt.

* * * * *